United States Patent
Tong et al.

(10) Patent No.: US 12,283,833 B2
(45) Date of Patent: Apr. 22, 2025

(54) STYLUS

(71) Applicant: VIVO MOBILE COMMUNICATION CO., LTD., Dongguan (CN)

(72) Inventors: Yuheng Tong, Dongguan (CN); Zhanwu Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/204,921

(22) Filed: Jun. 1, 2023

(65) Prior Publication Data
US 2023/0318327 A1    Oct. 5, 2023

Related U.S. Application Data

(63) Continuation of application No. PCT/CN2021/133377, filed on Nov. 26, 2021.

(30) Foreign Application Priority Data

Dec. 2, 2020    (CN) .......................... 202011391137.6

(51) Int. Cl.
*H02J 7/00*    (2006.01)
*G06F 3/0354*    (2013.01)
(Continued)

(52) U.S. Cl.
CPC ........ *H02J 7/0042* (2013.01); *G06F 3/03545* (2013.01); *G06F 3/038* (2013.01); *H02J 50/10* (2016.02)

(58) Field of Classification Search
CPC ..... H02J 7/0042; H02J 50/10; G06F 3/03545; G06F 3/038
See application file for complete search history.

(56) References Cited

U.S. PATENT DOCUMENTS

| | | |
|---|---|---|
| 9,678,547 B1 | 6/2017 | Mirov |
| 2007/0014490 A1 | 1/2007 | Silverbrook et al. |
| | (Continued) | |

FOREIGN PATENT DOCUMENTS

| | | |
|---|---|---|
| CN | 202838227 U | 3/2013 |
| CN | 103080877 A | 5/2013 |
| | (Continued) | |

OTHER PUBLICATIONS

International Search Report issued in corresponding International Application No. PCT/CN2021/133377, mailed Feb. 28, 2022, 4 pages.

(Continued)

*Primary Examiner* — Matthew A Eason
*Assistant Examiner* — Sujit Shah
(74) *Attorney, Agent, or Firm* — IPX PLLC

(57) ABSTRACT

A stylus includes a charging circuit, a battery, a power management integrated circuit, and a reset circuit. A charging port of the charging circuit and the battery are electrically connected to the power management integrated circuit through the reset circuit. The reset circuit is configured to: disconnect a path between the charging port and the power management integrated circuit and disconnect a path between the battery and the power management integrated circuit when the charging port is powered on, and connect the path between the charging port and the power management integrated circuit and connect the path between the battery and the power management integrated circuit after a specific period of time.

6 Claims, 4 Drawing Sheets

(51) Int. Cl.
*G06F 3/038* (2013.01)
*H02J 50/10* (2016.01)

(56) References Cited

U.S. PATENT DOCUMENTS

| | | | |
|---|---|---|---|
| 2012/0235715 | A1 | 9/2012 | Lee |
| 2013/0162219 | A1 | 6/2013 | Huang et al. |
| 2015/0188325 | A1* | 7/2015 | Wagner ................. H02J 7/0068 |
| | | | 307/31 |
| 2017/0269659 | A1* | 9/2017 | Chen ........................ G06F 1/263 |
| 2018/0191184 | A1* | 7/2018 | Yang ..................... H02J 7/0044 |
| 2020/0052520 | A1* | 2/2020 | Kang ...................... H02J 7/342 |
| 2020/0110477 | A1* | 4/2020 | Park .................... G06F 3/03545 |

FOREIGN PATENT DOCUMENTS

| | | |
|---|---|---|
| CN | 104079024 A | 10/2014 |
| CN | 206178716 U | 5/2017 |
| CN | 206557712 U | 10/2017 |
| CN | 207782762 U | 8/2018 |
| CN | 108988300 A | 12/2018 |
| CN | 111158510 A | 5/2020 |
| CN | 112527133 A | 3/2021 |
| KR | 20200114757 A | 10/2020 |
| WO | 2019157835 A1 | 8/2019 |

OTHER PUBLICATIONS

Partial supplementary European Search Report issued in related European Application No. 21899929.0, mailed Apr. 4, 2024, 16 pages.

First Office Action issued in related Chinese Application No. 202011391137.6, mailed Jun. 14, 2024, 7 pages.

* cited by examiner

STYLUS

CROSS-REFERENCE TO RELATED APPLICATIONS

This application is a continuation of International Application No. PCT/CN2021/133377, filed Nov. 26, 2021, which claims priority to Chinese Patent Application No. 202011391137.6, filed Dec. 2, 2020. The entire contents of each of the above-referenced applications are expressly incorporated herein by reference.

TECHNICAL FIELD

This application relates to the technical field of terminal devices, and specifically relates to a stylus.

BACKGROUND

With the update and iteration of electronic technologies, touchscreen technologies are also updated continuously. In order to improve user's experience of using a touchscreen, styli used as auxiliary input devices appear in various terminal devices. A stylus enables a user to accurately click on a screen region of an electronic device, thereby implementing various intelligent interaction functions. This increases enjoyment and convenience in using the electronic device.

In an existing stylus, a complete set of small-system electronic circuits is provided inside the stylus. As a result, in a specific working process, the stylus is prone to crash, resulting in failure of the stylus. For this problem, although a reset program can be installed in the stylus for resetting, if the reset program becomes faulty or internal firmware of a Power Management Integrated Circuit (PMIC) becomes abnormal, the stylus fails to be reset automatically. Therefore, the user needs to power off a system or the PMIC, to resolve this problem via a deep hard reset.

SUMMARY

Embodiments of this application are intended to provide a stylus that can reset automatically.

An embodiment of this application discloses a stylus, including a charging circuit, a battery, a power management integrated circuit, and a reset circuit, where both a charging port of the charging circuit and the battery are electrically connected to the power management integrated circuit through the reset circuit; and the reset circuit is configured to: disconnect a path between the charging port and the power management integrated circuit and disconnect a path between the battery and the power management integrated circuit when the charging port is powered on, and connect the path between the charging port and the power management integrated circuit and connect the path between the battery and the power management integrated circuit after a specific period of time.

The stylus disclosed in this embodiment of this application includes a charging circuit, a battery, a power management integrated circuit, and a reset circuit, where both a charging port of the charging circuit and the battery are electrically connected to the power management integrated circuit through the reset circuit; the reset circuit is electrically connected between the charging circuit and the power management integrated circuit; and the reset circuit is configured to disconnect or connect a path between the charging circuit and the power management integrated circuit. When the charging port is powered on, a path between the charging port and the power management integrated circuit and a path between the battery and the power management integrated circuit each are disconnected; and after a specific period of time, the path between the charging port and the power management integrated circuit and the path between the battery and the power management integrated circuit each are connected. Therefore, in a case that the stylus works abnormally, the path between the charging circuit and the power management integrated circuit may be disconnected first by using the reset circuit, so that the power management integrated circuit and another module in the stylus are powered off; then, the path between the charging circuit and the power management integrated circuit may be connected by using the reset circuit, so that the power management integrated circuit and the another module in the stylus are powered on; and finally, the stylus is enabled to reset automatically. A user would not need to perform a hard reset for enabling the stylus to continue to work normally.

DETAILED DESCRIPTION

The following describes embodiments of this application with reference to the accompanying drawings. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects instead of describing a specific order or sequence. It should be understood that the data used in such a way is interchangeable in appropriate circumstances, so that the embodiments of this application can be implemented in other orders than the order illustrated or described herein. Moreover, the objects distinguished by "first" and "second" are usually of one type, and the quantity of objects is not limited. For example, there may be one or more first objects. In addition, in the specification and the claims, "and/or" represents at least one of connected objects, and a character "/" generally represents an "or" relationship between associated objects.

With reference to the accompanying drawings, a stylus provided in the embodiments of this application is described below in detail by using embodiments and application scenarios thereof.

Figure 1:
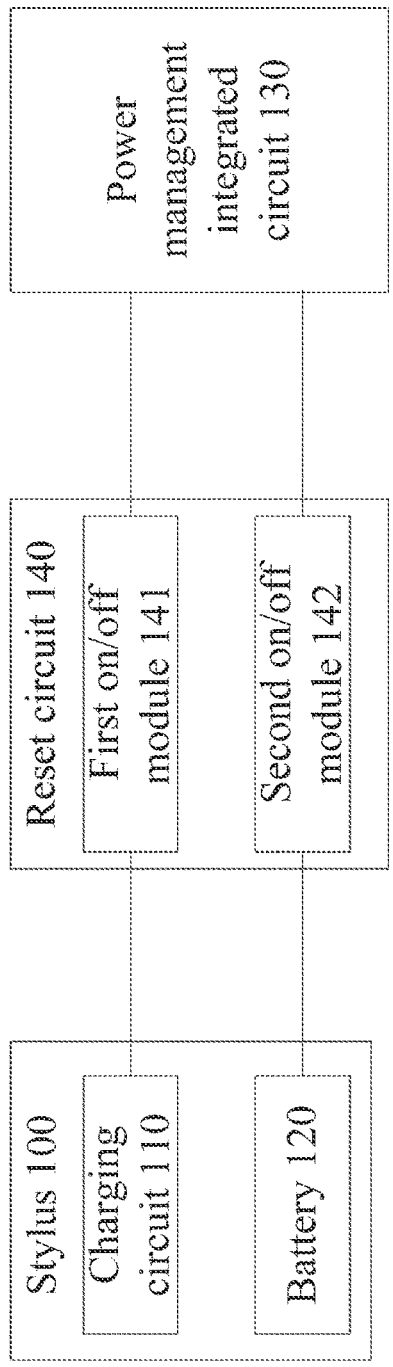
FIG. 1 is a schematic diagram of a structure of a stylus, according to an embodiment of this application.

FIG. 1 is a schematic diagram of a structure of a stylus according to an embodiment of this application. As shown in FIG. 1, the stylus 100 may include a charging circuit 110, a battery 120, a power management integrated circuit 130, and a reset circuit 140.

In this embodiment of this application, the charging circuit 110 is configured to provide power for the stylus 100, to ensure that the stylus 100 can work normally. Both a charging port of the charging circuit 110 and the battery 120 are electrically connected to the power management integrated circuit 130 through the reset circuit 140. The reset circuit 140 is electrically connected between the charging circuit 110 and the power management integrated circuit 130. The reset circuit 140 is configured to disconnect or connect a path between the charging circuit 110 and the power management integrated circuit 130. When the charging port is powered on, a path between the charging port and the power management integrated circuit 130 and a path between the battery 120 and the power management integrated circuit 130 each are disconnected; and after a specific period of time, the path between the charging port and the power management integrated circuit 130 and the path between the battery 120 and the power management integrated circuit 130 each are connected. Therefore, in a case that the stylus 100 works abnormally, the stylus 100 may be inserted into the charging port, so that the charging port of the charging circuit 110 is powered on; the path between the charging circuit 110 and the power management integrated circuit 130 may be disconnected first by using the reset circuit 140, so that the power management integrated circuit 130 and another module in the stylus 100 are powered off; then, the path between the charging circuit 110 and the power management integrated circuit 130 may be connected by using the reset circuit 140, so that the power management integrated circuit 130 and the another module in the stylus 100 are powered on; and finally, the stylus 100 is enabled to reset automatically.

In a possible implementation of this embodiment of this application, the reset circuit 140 may include a first on/off module 141 and a second on/off module 142. The first on/off module 141 is electrically connected between the charging port and the power management integrated circuit 130, and is configured to: disconnect a first path between the charging port and the power management integrated circuit 130 when the charging port is powered on, and connect the first path after a specific period of time. The second on/off module 142 is electrically connected between the battery 120 and the power management integrated circuit 130, and is configured to: disconnect a second path between the battery 120 and the power management integrated circuit 130 when the charging port is powered on, and connect the second path after a specific period of time.

In this way, in a case that the stylus 100 works abnormally, the path between the charging circuit 110 and the power management integrated circuit 130 and the path between the battery 120 and the power management integrated circuit 130 are respectively disconnected by using the first on/off module 141 and the second on/off module 142, so that each circuit module of the stylus 100 is powered off; and then, the path between the charging circuit 110 and the power management integrated circuit 130 and the path between the battery 120 and the power management integrated circuit 130 are respectively connected by using the first on/off module 141 and the second on/off module 142, so that each circuit module of the stylus 100 is powered on. This implements an automatic reset circuit of the stylus 100.

In a possible solution, the reset circuit 140 may further include a capacitor element and a first resistor element; the first on/off module 141 may include a first field-effect transistor; and the second on/off module 142 may include a second field-effect transistor. A drain of the first field-effect transistor is electrically connected to the charging port. A source of the first field-effect transistor is electrically connected to the power management integrated circuit 130. A gate of the first field-effect transistor is electrically connected to a first end of the capacitor element. A drain of the second field-effect transistor is electrically connected to a cathode of the battery 120. A source of the second field-effect transistor is electrically connected to the power management integrated circuit 130. A gate of the second field-effect transistor is electrically connected to the first end of the capacitor element. A second end of the capacitor element is electrically connected to the charging port of the charging circuit 110, that is, gate voltages of the first field-effect transistor and the second field-effect transistor can be pulled up to a voltage at the charging port of the charging circuit 110 through the capacitor element. One end of the first resistor element is electrically connected to the gate of the first field-effect transistor, the gate of the second field-effect transistor, and the first end of the capacitor element separately. Both another end of the first resistor element and an anode of the battery 120 are grounded.

In the foregoing possible implementation, both the first field-effect transistor and the second field-effect transistor may be enhanced P-type field-effect transistors (PMOS). For example, in a circuit structure shown in FIG. 2, the first field-effect transistor is PMOS1, the second field-effect transistor is PMOS2, and the gates of PMOS1 and PMOS2 are electrically connected to the charging port of the charging circuit 110 through a capacitor C (namely, the capacitor element). In addition, the gates of PMOS1 and PMOS2 are electrically connected to the anode of the battery 120 through a resistor R (namely, the first resistor element). Connection/disconnection of the first path (namely, the path between the charging port of the charging circuit 110 and the power management integrated circuit 130) and connection/disconnection of the second path (namely, the path between the cathode of the battery and the power management integrated circuit 130) may be respectively controlled by the first field-effect transistor and the second field-effect transistor.

Figure 3:
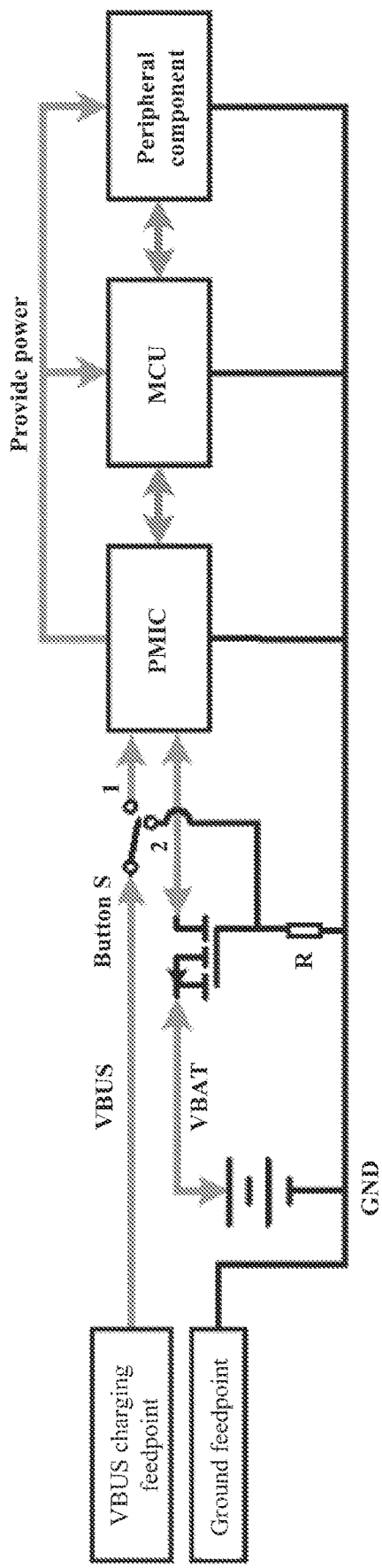
FIG. 3 is a schematic diagram of another circuit structure of a stylus, according to an embodiment of this application.

In another possible implementation, the reset circuit 140 may further include a second resistor element; the first on/off module 141 may include a path switching switch; and the second on/off module 142 may include a third field-effect transistor. A first end of the path switching switch is electrically connected to the charging port. A second end of the path switching switch is electrically connected to the power management integrated circuit 130. A third end of the path switching switch is electrically connected to a gate of the third field-effect transistor. The path switching switch is controlled to connect a path between the first end and the second end (namely, the foregoing first path), or connect a path between the first end and the third end. A drain of the third field-effect transistor is electrically connected to a cathode of the battery 120. A source of the third field-effect transistor is electrically connected to the power management integrated circuit. One end of the second resistor element is electrically connected to the gate of the third field-effect transistor and the third end of the path switching switch separately. Both another end of the second resistor element and an anode of the battery 120 are grounded. In other words, in this possible implementation, the path switching switch is a selection switch, and there are the following choices: connecting the path between the first end and the second end and disconnecting the path between the first end and the third end, and connecting the path between the first end and the third end and disconnecting the path between the first end and the second end. Therefore, a voltage at the gate of the third field-effect transistor can be controlled, thereby controlling on/off of the third field-effect transistor, that is, controlling connection or disconnection of the second path. For example, in a circuit structure of a stylus shown in FIG. 3, the path switching switch is a button S, and the third field-effect transistor is a PMOS.

In a possible implementation, the charging circuit 110 may include a charging feedpoint and a ground feedpoint. In this case, the first path is a path between the charging feedpoint and the power management integrated circuit 130. The ground feedpoint is electrically connected to the anode of the battery 120.

Figure 2:
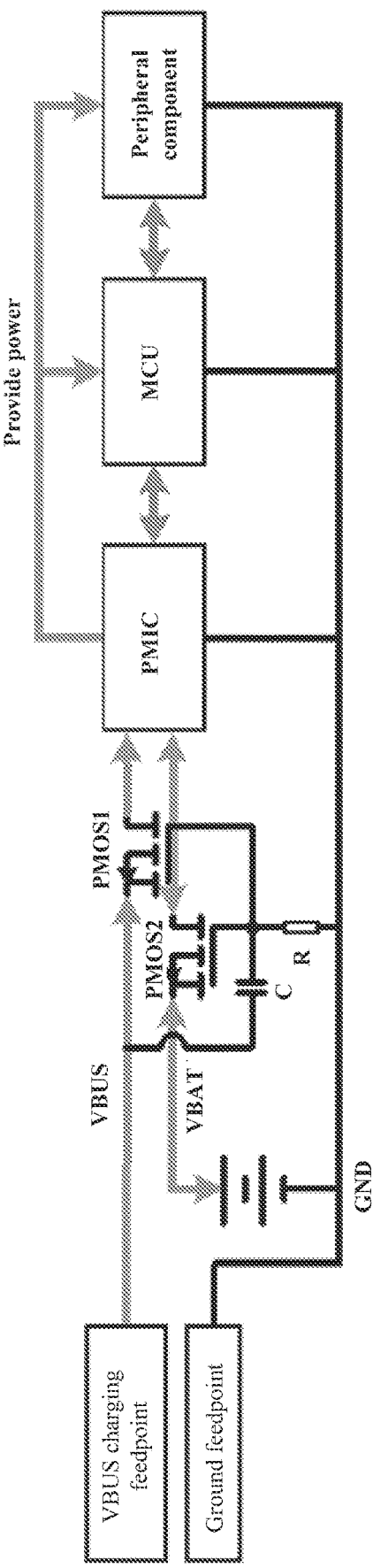
FIG. 2 is a schematic diagram of a circuit structure of a stylus, according to an embodiment of this application.

For example, in FIG. 2, PMOS1 is configured to control connection/disconnection of the first path between the VBUS charging feedpoint and the PMIC; and PMOS2 is configured to control connection/disconnection of the second path between the cathode of the battery 120 and the PMIC. During specific application, when the stylus 100 malfunctions and is unable to communicate, a terminal connected to the stylus 100 may prompt a user to insert the stylus 100 into a charging slot. After the stylus 100 is inserted, the charging feedpoint of the stylus 100 is in contact with a VBUS output spring plate of the terminal, and the charging feedpoint is powered on to charge the capacitor element C. After a period of time, the capacitor C discharges electricity and then outputs VBUS.

In an initial state (that is, when the stylus 100 is just inserted into the charging slot), the capacitor element C is de-energized, a voltage difference between the first end and the second end of the capacitor element is 0, gate voltages of PMOS1 and PMOS2 are VBUS, and gate-source voltages VGS of PMOS1 and PMOS2 are greater than 0. According to a conduction principle of a field-effect transistor, when PMOS1 and PMOS2 are cut off, the first path and the second path each are disconnected, and post-stage circuit modules (such as the PMIC, a Microcontroller Unit (MCU), and a peripheral component in FIG. 2) of the stylus 100 are powered off and reset. With the accumulation of electric charges in the capacitor element C, there comes a difference between voltages at the first end and the second end of the capacitor element C (that is, between a positive plate and a negative plate), and gate voltages of PMOS1 and PMOS2 decrease. After the gate-source voltages VGS become less than a minimum cut-in voltage VGS (th) during a decreasing process of the gate voltages of PMOS1 and PMOS2, PMOS1 and PMOS2 are conducted according to the conduction principle of the field-effect transistor. Therefore, the first path and the second path each are connected, power supply to the post-stage circuit modules (such as the PMIC, the MCU, and the peripheral component in FIG. 2) of the stylus 100 is restored, and the stylus 100 continues to work normally.

Figure 4:
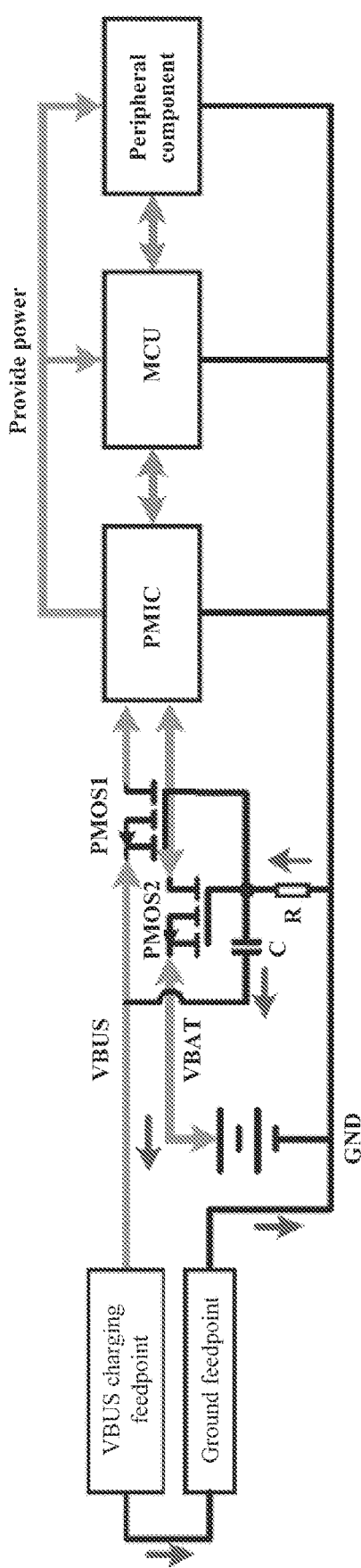
FIG. 4 is a schematic diagram of discharging a capacitor of a stylus, according to an embodiment of this application.

In a case that the stylus 100 is inserted into the charging slot for the stylus again after use, the VBUS charging feedpoint remains grounded for a period of time. As shown in FIG. 4, the capacitor C may fully discharge electricity through the VBUS charging feedpoint, the ground feedpoint, and the resistor R. After the VBUS charging feedpoint is powered on, the reset circuit 140 may implement a reset operation again.

In the foregoing possible implementation, a power-off reset logic circuit is added into the stylus 100, so that the stylus 100 can fulfill a deep hard reset function in a charging state. Moreover, in this possible implementation, there is no need to add an external interface for the stylus 100; and a hard reset circuit is added on the basis of an original structure. When a function of the stylus 100 becomes faulty, the user is guided to insert the stylus 100 into the charging slot, so that the charging feedpoint is in contact with a VBUS output spring plate of a smart terminal, and the function of the stylus 100 is restored after a reset action is completed.

For another example, in the circuit structure of the stylus 100 shown in FIG. 4, two enhanced PMOSs are separately added between a battery 120 of the stylus 100 and a PMIC. A gate of the PMOS is pulled down to a ground wire (GND) through a resistor R. A path switching switch is added to a path between a VBUS charging feedpoint and the PMIS. A path switching switch may be represented as a structure of a multi-functional button on the stylus 100 (the multi-functional button may reuse an original structure of the stylus). When the button is not pressed, a connected path is a path 1; and when the button is pressed, the connected path is switched to a path 2.

When the stylus 100 malfunctions and is unable to communicate normally, a terminal connected to the stylus 100 may prompt a user to insert the stylus 100 into a stylus accommodation slot (namely, a charging slot). When the stylus 100 is not at a charging position, a charging feedpoint of the terminal is de-energized, and is connected to the GND to prevent corrosion. After it is detected that the stylus 100 is inserted/in position, the charging feedpoint of the terminal outputs VBUS. After VBUS is output, the connected path may be switched from the path 1 to the path 2 by pressing the path switching switch, so that power supply from the VBUS charging feedpoint to the PMIC is cut off. At the same time, a gate voltage of the PMOS is VBUS, so that VGS>0. A PMOS is turned off, and power supply from a cathode (VBAT) of battery 120 to the PMIC is cut off, so that each post-stage circuit module of the stylus 100 is powered off and reset. After the button is released, the path switching switch rebounds, the connected path returns to the path 1, the PMOS is conducted, power supply of the stylus 100 is restored, and a circuit works normally.

In the foregoing possible implementation, when the stylus 100 is pulled out from the charging slot, the stylus 100 can work normally, and there is no input to the VBUS charging feedpoint. Therefore, the multi-functional button that is an external representation of the path switching switch can be freely configured for another function, that is, impact on power supply to the system through a VBAT path can be avoided even when the connected path is switched to the path 2 due to pressing.

Figure 5:
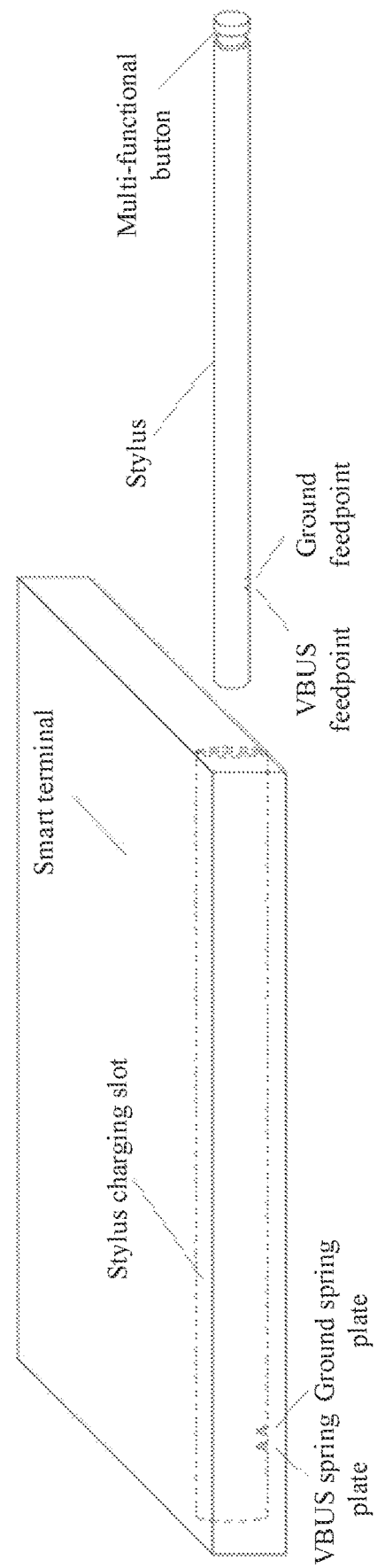
FIG. 5 is a schematic diagram of an outline structure of a stylus, according to an embodiment of this application.

As shown in FIG. 5, the foregoing multi-functional button may be provided at a crown of the stylus 100, to reduce space occupied by the stylus 100 in a radial direction.

In another possible implementation, the charging circuit 110 may include an electromagnetic induction coil and a rectifier circuit. In this possible implementation, an input end of the rectifier circuit is electrically connected to the electromagnetic induction coil, and an output end of the rectifier circuit is the foregoing charging port. The rectifier circuit may rectify an input alternating current to output a direct current. In other words, in this possible implementation, the stylus 100 may be charged through the electromagnetic induction coil, that is, the stylus 100 may be charged in a wireless charging manner.

In the foregoing possible implementation, the rectifier circuit may be any rectifier circuit, for example, a bridge rectifier circuit or a zero rectifier circuit. This is not specifically limited in this embodiment of this application.

In the foregoing possible implementation, in a case that the stylus 100 is charged in the wireless charging manner, if the first on/off module 141 includes a first field-effect transistor, and the second on/off module 142 includes a second field-effect transistor, the reset circuit 140 may further include a diode. A cathode of the diode is electrically connected to a gate of the first field-effect transistor, a gate of the second field-effect transistor, and a first end of a capacitor element separately. Both an anode of the diode and an anode of the battery 120 are grounded, that is, the diode and a first resistor element are connected in parallel between a connection point and the ground. The connection point is a point at which the gate of the first field-effect transistor, the gate of the second field-effect transistor, and the first end of the capacitor element are connected. According to a principle that a forward resistance of a diode is small and a reverse resistance of the diode is large, an approach may be provided for electricity discharging of the capacitor element.

Figure 6:
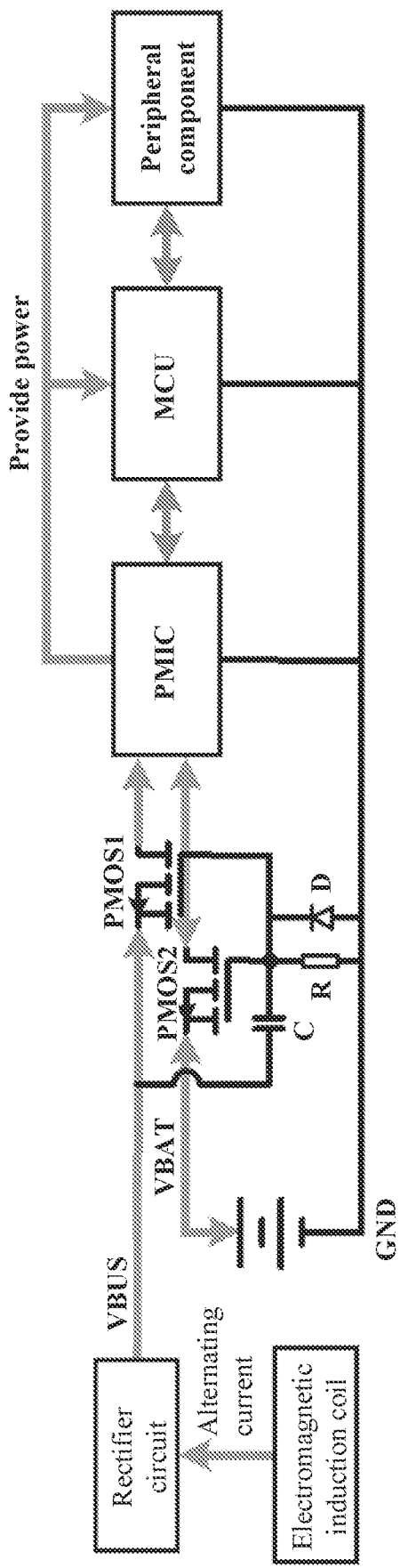
FIG. 6 is a schematic diagram of still another circuit structure of a stylus, according to an embodiment of this application.

For example, in FIG. 6, enhanced PMOS1 and PMOS2 are respectively added between a rectifier circuit of the stylus 100 and a PMIC and between a battery and the PMIC. Gate voltages of PMOS1 and PMOS2 may be pulled up to a VBUS charging feedpoint through a capacitor C, and pulled down to GND through a resistor R. A diode D is connected in parallel to the resistor R. When the stylus 100 malfunctions and is unable to communicate, a terminal connected to the stylus 100 may prompt a user to insert the stylus 100 into a charging slot. When the stylus 100 is not at a charging position, a charging coil of the terminal does not perform outputting, so that power consumption is reduced. After it is detected that the stylus 100 is in position, the terminal performs outputting; the rectifier circuit performs conversion; and finally, the stylus outputs VBUS. Therefore, after the stylus 100 is inserted, VBUS is powered on to charge the capacitor C. After a period of time, the charging completes, and the capacitor C discharges electricity and then outputs VBUS.

After the stylus 100 is inserted, the capacitor C is de-energized in an initial state; a voltage difference between a positive plate and a negative plate is 0; the gate voltages of the two PMOSs are VBUS, VGS>0, and all post-stage circuits are powered off and reset by switching off the two PMOSs. With the accumulation of electric charges in the capacitor, there comes a difference between voltages of the positive plate and the negative plate of the capacitor C, and the gate voltages of the two PMOSs decrease. After VGS becomes lower than VGS (th), PMOS1 and PMOS2 each are conducted, and power supply to a post-stage system is restored.

Figure 7:
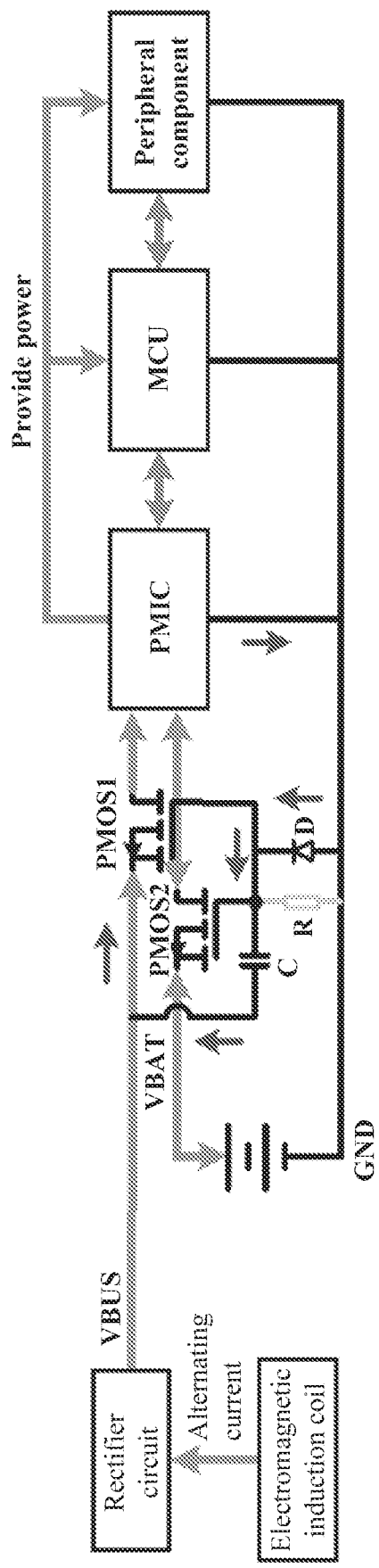
FIG. 7 is another schematic diagram of discharging a capacitor of a stylus, according to an embodiment of this application.

After the stylus 100 is pulled out for use, the electromagnetic coil does not receive electric energy; output of the rectifier circuit is suspended; and the capacitor C may be fully discharged through the path shown in FIG. 7. A reset action may be implemented again after VBUS is powered on.

The embodiments of this application are described above with reference to the accompanying drawings. However, this application is not limited to the foregoing implementations. The foregoing implementations are merely illustrative instead of restrictive. Under the enlightenment of this application, a person of ordinary skill in the art may make many forms without departing from the essence of this application and the protection scope of claims, all of which fall within the protection of this application.

The invention claimed is:

1. A stylus, comprising a charging circuit, a battery, a power management integrated circuit, and a reset circuit, wherein:
  a charging port of the charging circuit and the battery are electrically connected to the power management integrated circuit through the reset circuit;
  the reset circuit is configured to: disconnect a path between the charging port and the power management integrated circuit and disconnect a path between the battery and the power management integrated circuit when the stylus is inserted into the charging port causing the charging port to be powered on, and connect the path between the charging port and the power management integrated circuit and connect the path between the battery and the power management integrated circuit after a specific period of time;
  the reset circuit comprises a first on/off module and a second on/off module, wherein:
    the first on/off module is electrically connected between the charging port and the power management integrated circuit, and is configured to: disconnect a first path between the charging port and the power management integrated circuit when the charging port is powered on, and connect the first path after a specific period of time; and
    the second on/off module is electrically connected between the battery and the power management integrated circuit, and is configured to: disconnect a second path between the battery and the power management integrated circuit when the charging port is powered on, and connect the second path after a specific period of time,
  wherein when the reset circuit further comprises a capacitor element and a first resistor element, the first on/off module comprises a first field-effect transistor, and the second on/off module comprises a second field-effect transistor, wherein:
    a drain of the first field-effect transistor is electrically connected to the changing port, a source of the first field-effect transistor is electrically connected to the power management integrated circuit, and a gate of the first field-effect transistor is electrically connected to a first end of the capacitor element;
    a drain of the second field-effect transistor is electrically connected to a cathode of the battery, a source of the second field-effect transistor is electrically connected to the power management integrated circuit, and a gate of the second field-effect transistor is electrically connected to the first end of the capacitor element;
    a second end of the capacitor element is electrically connected to the charging port of the charging circuit; and
    one end of the first resistor element is electrically connected to the gate of the first field-effect transistor, the gate of the second field-effect transistor, and the first end of the capacitor element separately, and both another end of the first resistor element and an anode of the battery are grounded,
  wherein when the reset circuit further comprises a second resistor element the first on/off module comprises a path switching switch, and the second on/off module comprises a third field-effect transistor wherein:

a first end of the path switching switch is electrically connected to the changing port, a second end of the path switching switch is electrically connected to the power management integrated circuit, a third end of the path switching switch is electrically connected to a gate of the third field effect transistor, and the path switching switch is controlled to connect a path between the first end and the second end or connect a path between the first end and the third end;

a drain of the third field-effect transistor is electrically connected to a cathode of the battery, and a source of the third field-effect transistor is electrically connected to the power management integrated circuit; and one end of the second resistor element is electrically connected to the gate of the third field-effect transistor and the third end of the path switching switch separately, and both another end of the second resistor element and an anode of the battery are grounded.

2. The stylus according to claim 1, wherein the path switching switch is a button.

3. The stylus according to claim 1, wherein the charging circuit comprises a charging feedpoint and a ground feedpoint, the charging port is the charging feedpoint, and the ground feedpoint is electrically connected to the anode of the battery.

4. The stylus according to claim 2, wherein the charging circuit comprises a charging feedpoint and a ground feedpoint, the charging port is the charging feedpoint, and the ground feedpoint is electrically connected to the anode of the battery.

5. The stylus according to claim 1, wherein the charging circuit comprises an electromagnetic induction coil and a rectifier circuit, an input end of the rectifier circuit is electrically connected to the electromagnetic induction coil, and an output end of the rectifier circuit is the charging port.

6. The stylus according to claim 2, wherein the charging circuit comprises an electromagnetic induction coil and a rectifier circuit, an input end of the rectifier circuit is electrically connected to the electromagnetic induction coil, and an output end of the rectifier circuit is the charging port.

* * * * *